Sept. 22, 1959　　J. F. KOSTOLECKI ET AL　　2,905,275
CASTER BRAKE

Filed Oct. 11, 1957　　2 Sheets-Sheet 1

Inventors
John F. Kostolecki
Anthony Douglas Muto
By their Attorneys

Sept. 22, 1959  J. F. KOSTOLECKI ET AL  2,905,275
CASTER BRAKE

Filed Oct. 11, 1957

Inventors
John F. Kostolecki
Anthony Douglas Muto
By their Attorneys

United States Patent Office 2,905,275
Patented Sept. 22, 1959

2,905,275
CASTER BRAKE

John F. Kostolecki, Palmer, and Anthony Douglas Muto, Springfield, Mass., assignors to Jarvis & Jarvis, Inc., Palmer, Mass., a corporation of Massachusetts Application October 11, 1957, Serial No. 689,538

6 Claims. (Cl. 188—74)

The present invention relates to improved braking means for casters.

One object of the invention is to provide an improved caster brake construction which is economical to manufacture, which may be readily incorporated in pre-existing caster constructions, and which is reliable in operation over a long period of time.

Another object of the invention is to provide such improved braking means which are readily adjustable to compensate for wear of the caster wheel.

The above and other related objects, as well as the novel constructional features of the invention will be apparent from the reading of the following detailed description of the disclosure found in the drawing, and the particular novelty thereof pointed out in the appended claims.

Figure 1:
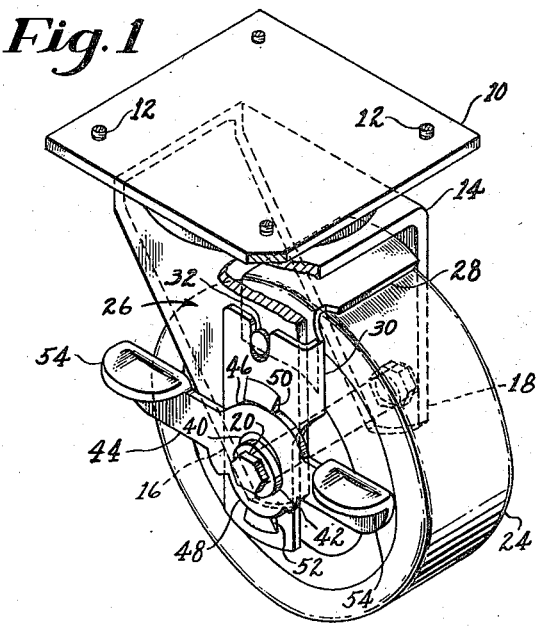
Fig. 1 is a perspective view of a caster having a brake constructed in accordance with the present invention.
Figure 2:
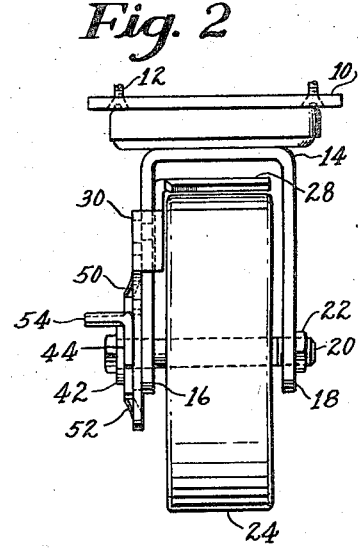
Fig. 2 is a front elevation of the caster and brake structure seen in Fig. 1.
Figure 3:
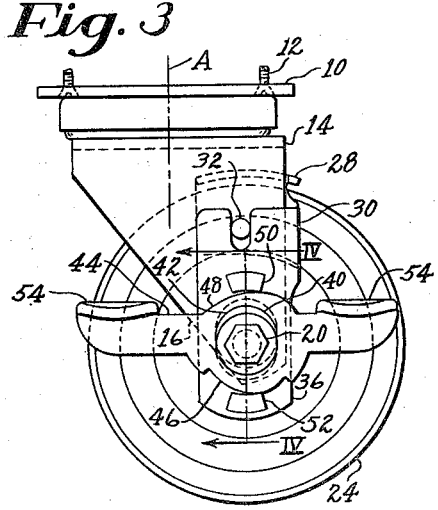
Fig. 3 is a side elevation of the same construction.

Referring to Figs. 1 to 3 it will be seen that the caster shown therein comprises a mounting plate 10 which may be secured to the undersurface of such articles as platforms and the like as by screws 12. A U-shaped bracket 14 is pivotally mounted on the undersurface of the plate 10 for rotation about the vertical axis A (Fig. 3) by way of conventional means not illustrated. Spanning the lower free arms 16 and 18 of bracket 14 is an axle bolt 20 which is held in fixed relation by a nut 22. It will be noted that the horizontal axis of the bolt 20 is offset from the vertical axis A about which the bracket 14 pivots. This is a conventional relationship of caster axes which is preferred to give easier turning of the caster.

A wheel 24 is mounted for rotation on the axle bolt 20 between the bracket arms 16 and 18. All of the parts so far described are of well known conventional form.

Figure 4:
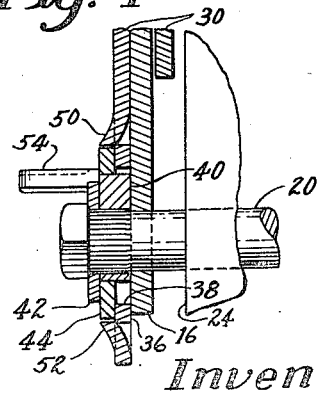
Fig. 4 is a section, on an enlarged scale, taken on line IV—IV in Fig. 3.

The improved braking means of the present invention comprise a brake member indicated generally by the reference character 26 which is integrally formed from a single piece of sheet metal as by bending and stamping. The member 26 comprises a wheel engaging portion 28 which overlies the wheel 24 and is formed with a complementary radial engaging surface, which, if desired, may be covered with a friction material. The wheel engaging portion 28 blends with a U-shaped portion 30 which U-shaped portion (Fig. 1) embraces the inner and outer faces of the bracket arm 16. The following means provide for substantially vertical guided movement of the bracket member 26. A pin 32 extends outwardly from the bracket arm 16 and is received by a slot 34 (Fig. 5) formed in the outer branch of U-shaped portion 30. This outer branch also has a depending portion 36 (Fig. 5) which is slotted at 38 to receive a bushing 40 (see also Fig. 4). The brake member 26 is thus guided for limited vertical reciprocation.

The bushing 40, for reasons which further appear is eccentrically apertured to receive the axle bolt 20 which is serrated beneath its head so that the bushing 40 will turn with the axle bolt 20. It will also be seen (Fig. 4) that the bushing 40 is interposed between the bracket arm 16 and a washer 42 beneath the head of bolt 20, with an actuating lever 44 rotatably mounted on the bushing 40. The axial length of the bushing 40 is greater than the combined thickness of the lever 44 and depending brake member portion 36. The nut 22 may thus be fully tightened to lock the eccentric bushing in a desired position and yet the actuating lever 44 will be free to rotate about the bushing 40 and the bracket member 36 free to slide up and down.

The actuating lever 44 is provided with complementary cam surfaces 46, 48, which are respectively engaged by tongues 50, 52 which are struck from the depending portion 36 of the brake member 26. Preferably, the lever 44 is provided with pads 54 at either end which may be engaged by an operator's foot to rotate the lever in one direction or another.

The cams 46 and 48 are formed to positively raise or lower the brake member 26 as they engage the tongues 50, 52. Thus, as the left hand pad (Fig. 3) is depressed the brake member 26 will be raised and the wheel engaging portion 28 raised away from the wheel 24 as is seen in Figs. 1–3. When it is desired to lock the caster the right hand pad is depressed and the cams are so arranged to lower the brake member 26 and bring the wheel engaging portion 28 into braking engagement with the wheel 24 as is seen in Fig. 5.

At either end of the cam surface 48 are projections 56 which engage opposite sides of the tongue 52 to limit pivotal movement of the lever 44. Thus either or both of the pads 54 will also be positioned for ready engagement by the foot of the person using these braking means.

Figure 5:
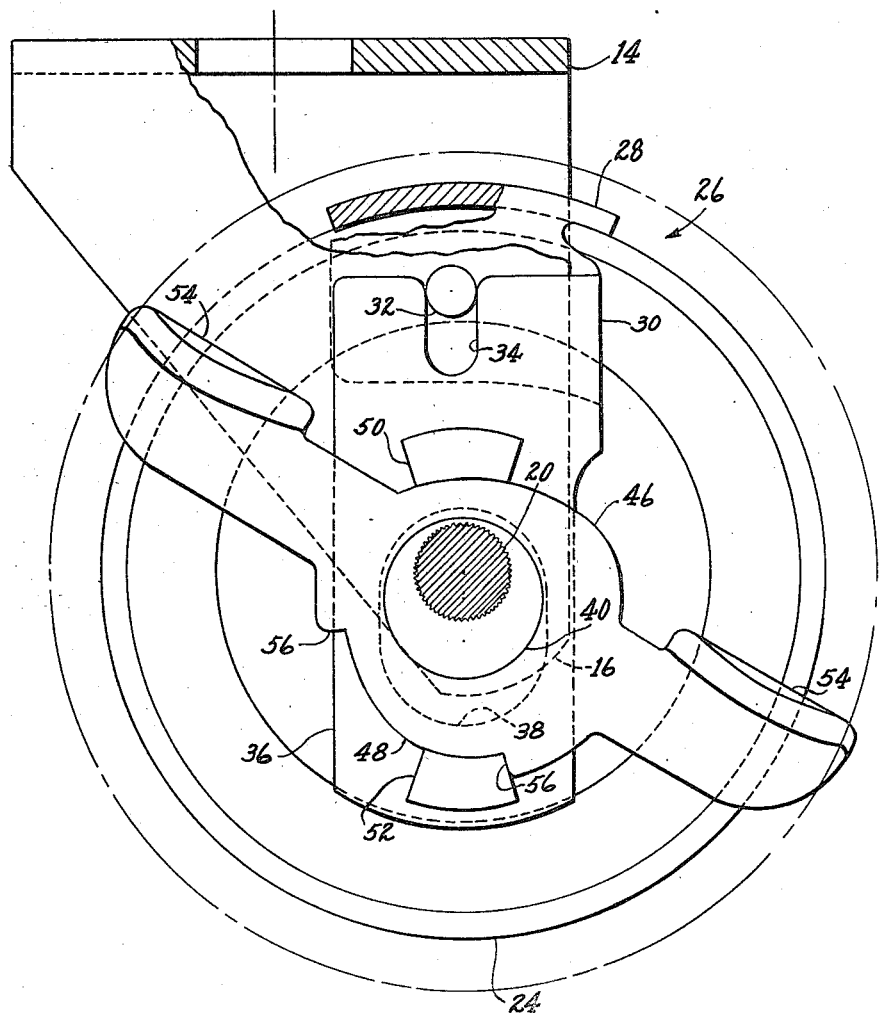
Fig. 5 is a side elevation, on a further enlarged scale and in an adjusted position, of said caster and brake, with certain portions broken away and others in section.

It will be noted that the above-described braking and brake releasing actions occur regardless of the angular adjustment of the eccentric bushing 40 as can be seen from comparison of Fig. 3 where the eccentric bushing is in its uppermost position and Fig. 5 where it is in its lowermost position. This results in the bushing adjustment being capable of compensating for wear which would reduce the diameter of the wheel 24. With eccentric bushing 40 adjusted to its uppermost position of Fig. 3 the wheel engaging portion 28 will be effectively brought into and out of engagement with the wheel 24 when it is new and possesses its maximum diameter. The cam surfaces 46, 48 are so formed that correct braking action will continue to be obtained in spite of minor reductions in the diameter of the wheel 24. However, as this diameter becomes substantially reduced (from the phantom diameter $d$ of Fig. 5) it will be necessary to periodically rotate the bushing 40 until it is at last brought to the lowermost position seen in Fig. 5 where it will position the wheel engaging portion 28 for effective braking action on the wheel 24 when it has worn to what may be assumed its smallest diameter before replacement or retreading is necessary.

It will also be noted that, in any adjusted position, the braking force applied by the member 28 is applied downwardly in a substantially vertical direction which imparts no turning moment on the wheel 24 and thus renders the caster stable both when the brake is set and when it is released.

The described braking means have been found most economical to manufacture and comprises a minimum of parts. It will further be noted that the caster construction itself was affected in only a minor way by the addition of pin 32. In other words, the method of manufacturing the caster itself required practically no change in order to incorporate the present improved braking mechanism, a factor which is of vital importance in being able to provide additional and desirable features to a presently existing product.

Having thus described the invention, what is novel and desired to be secured by United States Letters Patent is:

1. In a caster of the type having an inverted U-shaped bracket rotatably mounted about a vertical axis, an axle bolt extending between the lower free ends of said bracket, and a wheel rotatably mounted on said axle bolt between the arms of said bracket; a caster brake construction comprising an integral brake member having a U-shaped portion embracing the inner and outer faces of one of said bracket arms and is spaced above said axle bolt, a wheel engaging portion overlying said wheel and merging with said U-shaped portion and a depending portion extending from the outer branch of said U-shaped portion in contiguous relation with the outer face of said one arm and below said axle bolt, a pin extending from said one bracket arm, said U-shaped portion being slotted to receive said pin and said depending portion being slotted to receive said axle bolt and thus guide said brake member for vertical movement, a bushing mounted on said axle bolt between said bracket arm and one end of said bolt, said bushing also being received by the slot in said depending portion, a lever pivotally mounted about said axle on said bushing and contiguous with the outer surface of said depending portion, said depending portion and said lever being held in contiguous relation by the head of said bolt, the axial length of said bushing being greater than the combined thickness of said lever and said depending portion to prevent binding of said lever and depending portion upon tightening of the axle bolt, said lever having upper and lower corresponding cam surfaces formed radially of said axle, said depending portion having cam engaging tongues struck therefrom and lying in the same plane as said cam surfaces, said cam surfaces being formed to positively raise said brake member out of braking relation upon rotation of the lever in one direction and to bring the wheel engaging portion into braking engagement with said wheel upon rotation of the lever in the opposite direction.

2. A caster as in claim 1 wherein the cam engaging tongues have side surfaces formed generally radially of said axle bolt, radial projections are provided at either end of one of said cam surfaces to limit the throw of said lever by abutting engagement with one of said tongues.

3. In a caster of the type having an inverted U-shaped bracket rotatably mounted about a vertical axis, an axle bolt having serrations under its head and extending between the lower free ends of said bracket, a nut for tightening said axle bolt, and a wheel rotatably mounted on said axle bolt between the arms of said bracket; a caster brake construction comprising an integral brake member having a U-shaped portion embracing the inner and outer faces of one of said bracket arms, a wheel engaging portion overlying said wheel and merging with said U-shaped portion and a depending portion extending from the outer branch of said U-shaped portion in contiguous relation with the outer face of said one arm and below said axle bolt, a pin extending from said one bracket arm, said U-shaped portion being slotted to receive said pin and said depending portion being slotted to receive said axle bolt and thus guide said brake member for vertical movement, a bushing eccentrically mounted on the head end of said axle bolt in fixed relation with said serrations and engaging said one bracket arm, said bushing also being received by the slot in said depending portion, a lever pivotally mounted about said axle on said eccentric bushing and contiguous with said depending portion, the axial length of said bushing being greater than the combined thickness of said lever and said depending portion to prevent binding of said lever and depending portion upon tightening of said axle nut, said lever having upper and lower corresponding cam surfaces formed radially of said axle, said depending portion having cam engaging portions struck therefrom and lying in the same plane as said cam surfaces, said cam surfaces being formed to positively raise said brake member out of braking relation upon rotation of the lever in one direction and to bring the wheel engaging portion into braking engagement with said wheel upon rotation of the lever in the opposite direction, said axle bolt being rotatable in said bracket arms to adjust the position in which the eccentric bushing may be clamped by said axle nut thereby compensating for wear of said wheel.

4. In a caster of the type having an inverted U-shaped bracket rotatably mounted about a vertical axis, an axle bolt extending between the lower free ends of said bracket and a wheel rotatably mounted on said axle bolt between the arms of said bracket; a caster brake construction comprising a brake member having a U-shaped portion embracing the inner and outer faces of one of said bracket arms above said axle bolt, a wheel-engaging portion overlying said wheel and merging with said U-shaped portion and a depending portion extending from the outer branch of said U-shaped portion and below said axle bolt, a pin extending from said one bracket arm, said U-shaped portion being slotted to receive said pin and said depending portion being slotted to receive said axle bolt and thus guide said brake member for travel radially of said axle bolt, a lever pivotally mounted on said axle adjacent said depending portion, said lever having upper and lower cam surfaces formed radially of said axle, said depending portion having cam-engaging portions struck therefrom and lying in the same plane as said cam surfaces, said cam surfaces being formed and rotatable to control the travel of said brake member into and out of braking relation with said wheel, means for selectively changing the radial distance of said cam surfaces from said axle bolt independently of cam rotation to insure brake operation despite substantial wear of said wheel.

5. In a caster of the type having an inverted U-shaped bracket rotatably mounted upon a vertical axis, an axle bolt extending between the lower free ends of said bracket and a wheel rotatably mounted on said axle bolt between the arms of said bracket; a caster brake construction comprising a brake member slidably mounted on one of said bracket arms radially of said axle bolt, means angularly movable with respect to said axle bolt for camming said brake member into and out of braking engagement with the surface of said wheel, and means for raising and lowering said camming means and said brake member as a unit to insure brake operation despite substantial wear of said wheel.

6. In a caster of the type having an inverted U-shaped bracket rotatably mounted about a vertical axis, an axle bolt extending between the lower free ends of said bracket, a nut for tightening said axle bolt and a wheel rotatably mounted on said axle bolt between the arms of said bracket; a caster brake construction comprising an integral brake member having a U-shaped portion embracing the inner and outer faces of one of said bracket arms, a wheel-engaging portion overlying said wheel and merging with said U-shaped portion and a depending portion extending from the outer branch of said U-shaped portion in contiguous relation with the outer face of said one arm below said axle bolt, a pin extending from said one bracket arm, said U-shaped portion being slotted to receive said pin and said depending portion being slotted to receive said axle bolt and thus guide said brake member for vertical movement, a bushing eccentrically mounted on the head of said axle bolt in fixed relation thereto and engaging said one bracket arm, said bushing also being received by the slot in said depending portion, a lever pivotally mounted on said eccentric bushing and contiguous wtih said depending portion, the axial length of said bushing being greater than the combined thickness of said lever and said depending portion to prevent binding of said lever and said depending portion upon tightening of said axle nut, said lever having upper and lower corresponding cam surfaces formed radially of said axle, said depending portion having cam-engaging portions struck therefrom and lying in the same plane as said cam surfaces, said cam surfaces being formed to positively raise said brake member out of braking relation upon rotation of the lever in one direction and to bring the wheel-engaging portion into a braking engagement with said wheel upon rotation of the lever in the opposite direction, said axle bolt being rotatable in said bracket arms to adjust the position in which the eccentric bushing may be held by said axle nut thereby compensating for wear for said wheel.

References Cited in the file of this patent

UNITED STATES PATENTS

| 2,147,064 | Schultz | Feb. 14, 1939 |
| 2,241,728 | Loweke | May 13, 1941 |

FOREIGN PATENTS

| 572,044 | Germany | Mar. 11, 1933 |